(12) United States Patent
Gao et al.

(10) Patent No.: US 7,759,015 B2
(45) Date of Patent: Jul. 20, 2010

(54) SEPARATOR FOR FUEL CELL WITH AUSTENITIC STAINLESS STEEL SUBSTRATE

(75) Inventors: Yunzhi Gao, Saitama-ken (JP); Jun Satou, Saitama-ken (JP); Toshikatsu Hayashi, Saitama-ken (JP)

(73) Assignee: Kabushiki Kaisha Riken, Tokyo (JP)

( * ) Notice: Subject to any disclaimer, the term of this patent is extended or adjusted under 35 U.S.C. 154(b) by 753 days.

(21) Appl. No.: 11/631,928

(22) PCT Filed: Jun. 21, 2005

(86) PCT No.: PCT/JP2005/011384

§ 371 (c)(1),
(2), (4) Date: Dec. 21, 2006

(87) PCT Pub. No.: WO2005/124910

PCT Pub. Date: Dec. 29, 2005

(65) Prior Publication Data

US 2008/0050635 A1    Feb. 28, 2008

(30) Foreign Application Priority Data

Jun. 21, 2004    (JP)    ............... 2004-182267

(51) Int. Cl.
*H01M 2/14*    (2006.01)
*H01M 2/16*    (2006.01)
*H01M 8/02*    (2006.01)
*B32B 15/18*    (2006.01)
*B32B 15/04*    (2006.01)

(52) U.S. Cl. ............... 429/457; 429/456; 429/469; 428/457; 428/688

(58) Field of Classification Search .................. None
See application file for complete search history.

(56) References Cited

U.S. PATENT DOCUMENTS 6,291,094 B1 *   9/2001   Yoshimura et al. ............ 429/34
2004/0048134 A1 *   3/2004   Kihira et al. ................. 429/34

FOREIGN PATENT DOCUMENTS

| EP | 1 302 556 A1 | 4/2003 |
| JP | 2002-047554 | 2/2002 |
| JP | 2003-113449 | 4/2003 |
| JP | 2003-148294 | 5/2003 |
| WO | WO 2004/007789 A2 | 1/2004 |

* cited by examiner

*Primary Examiner*—Dah-Wei Yuan
*Assistant Examiner*—Angela J. Martin
(74) *Attorney, Agent, or Firm*—Browdy and Neimark, PLLC (57) ABSTRACT

A fuel cell separator having excellent corrosion resistance, electric conductivity and durability comprising a substrate made of austenitic stainless steel, and a nitride layer formed on a surface of the substrate in contact with an oxygen electrode or a current collector on the oxygen electrode side, the nitride layer comprising a solid solution compound phase composed of an $Fe_4N$ crystal, in which part of Fe is substituted by at least Cr and Ni.

3 Claims, 5 Drawing Sheets

Fig. 9

SEPARATOR FOR FUEL CELL WITH AUSTENITIC STAINLESS STEEL SUBSTRATE

FIELD OF THE INVENTION

The present invention relates to a separator for a fuel cell with an austenitic stainless steel substrate, particularly a separator suitable for vehicle-mounted fuel cells, small portable fuel cells, stationary home fuel cells, etc.

BACKGROUND OF THE INVENTION

Because the fuel cells have high energy conversion efficiency from a fuel to electricity without emitting toxic materials, they are attracting much attention as the next-generation power generators. Particularly ion-exchange-polymer-membrane-type fuel cells operable at temperatures of 150° C. or lower are recently vigorously investigated, with the expectation that they will be put into practical use in several years. Because this type of fuel cells are operable at relatively low temperatures, generate high power density, and can be reduced in size, they are suitable for automobiles and home installments, etc.

The ion-exchange-polymer-membrane-type fuel cell is usually constituted by unit cells each comprising an ion-exchange fluororesin membrane containing sulfonic acid groups as a solid electrolyte membrane, and a fuel electrode and an oxygen (air) electrode attached to both surfaces of this membrane. Each electrode is usually composed of a porous material comprising carbon black, in which a water-repellent tetrafluoroethylene (PTFE) resin and fine precious metal particles as a catalyst are dispersed. The unit cells are laminated via planar separators each having gas-flowing grooves for uniformly supplying a fuel gas and air on both surfaces, to constitute a fuel cell stack.

The separator is required to have not only electric conductivity and gas tightness, but also chemical and electrochemical stability (corrosion resistance). Accordingly, conventional fuel cell separators are mostly made of carbon materials such as graphite. Though graphite has low electric resistance and high corrosion resistance, it has low mechanical strength and suffers from high working cost. Particularly in the case of vehicle-mounted fuel cells, the separator materials are required to have high mechanical strength, making it difficult to use graphite separators.

Proposed recently is a graphite separator produced by injection-molding a mixture of graphite powder and a resin and baking it at a high temperature. However, the resin-containing graphite separator is poorer in mechanical strength, electric resistance and thermal conductivity than the metal, and higher in electric resistance than a separator consisting of only a graphite material. Accordingly, the resin-containing graphite separator suffers from the reduction of cell power, and temperature elevation, not suitable for use in high-power fuel cells. Also, because the resin-containing graphite separator is produced by high-temperature baking, it has a low density. Although the graphite separator can be impregnated with a resin after baking and then baked again to increase its density, it needs a complicated production steps.

Other than carbon material separators, separators having metal substrates are investigated. The metal separators have much higher electric resistance, gas tightness and mechanical strength than carbon separators. In addition, the use of a metal can make the separators thinner, advantageous in reducing the weight. However, the metal is more vulnerable to corrosion than the carbon materials, and when metal ions generated by corrosion enter into the electrolytic membrane, the ion conductivity of the membrane is lowered, adversely affecting the performance of cells. Among metals other than precious metals, stainless steel has excellent corrosion resistance and workability, but it usually does not have sufficient electric conductivity because of a passive layer formed on the surface.

To solve the above-described problems of metal separators, for instance, JP 11-162478 A discloses a method of plating a precious metal on the entire surface of a metal separator to have improved corrosion resistance and electric conductivity. Despite high effects of improving corrosion resistance and electric conductivity, this method is not practical because a thick corrosion-resistant plating increases production cost. JP 2003-272649 A and JP 2003-272653 A disclose methods of forming an extremely thin gold plating on a metal separator to improve corrosion resistance. However, because a thin gold film has low strength, it is likely to be damaged when the separator is brought into contact with an electrode, causing corrosion in damaged portions. Thus, JP 2003-272671 A proposes a method of filling a soft conductor between an electrode and a metal separator. The soft conductor interposed between the electrode and the separator protects a corrosion-resistant layer of the separator, thereby improving the performance of a cell, but it increases the production cost because of the increased numbers of parts and assembling steps.

Among the stainless steel, particularly austenitic stainless steel has excellent corrosion resistance and workability, and separators comprising austenitic stainless steel substrates are proposed. For instance, JP 2002-151111 A and JP 2003-193206 A disclose austenitic stainless steel separators having metal carbides and/or borides exposed on the surface. These separators have reduced contact resistance with current collectors because of the exposed metal carbides and/or borides. However, because the types of metal carbides and borides are limited, the electric conductivity of these separators does not reach a sufficient level. Particularly, these separators do not fully use the advantages of a metal surface because of a passive layer formed on the exposed stainless steel surface, resulting in insufficient electric conductivity. In addition, the stainless steel having metal carbides and/or borides dispersed is not commonly available, requiring large investment on facilities to produce it.

Nitriding is known as a method for surface-treating stainless steel. For instance, JP 2003-113449 A describes that meta-stable austenitic stainless steel is turned to a separator material suitable for a fuel cell with improved surface strength and fatigue resistance, by gas-nitriding or salt bath-nitriding at a temperature of 300-650° C. However, JP 2003-113449 A is silent about the corrosion resistance of the separator material formed. In general, a nitride layer formed on a stainless steel surface has such low corrosion resistance that it is dissolved away by corrosion when used in a strong-acidity environment like fuel cell separators. It is thus likely that metal ions attach to polymer electrolyte membranes and electrodes, thereby lowering their performance, and that a passive layer of stainless steel is exposed, resulting in increased contact resistance. Thus, the performance of a fuel cell is deteriorated. As described above, even if an austenitic stainless steel substrate is used, low-cost separators having excellent electric conductivity and corrosion resistance have not been obtained yet.

OBJECTS OF THE INVENTION

Accordingly, an object of the present invention is to provide a fuel cell separator with an austenitic stainless steel substrate, which has excellent corrosion resistance, electric conductivity and durability.

DISCLOSURE OF THE INVENTION

As a result of intense research in view of the above object, the inventors have found that the formation of a nitride layer comprising a solid solution compound phase composed of an $Fe_4N$ crystal, in which part of Fe is substituted by at least Cr and Ni, on a surface of a fuel cell separator with an austenitic stainless steel substrate, which is in contact with an oxygen (air) electrode or a current collector on the oxygen electrode side, provides the fuel cell separator with excellent corrosion resistance, electric conductivity and durability. The present invention has been completed based on such finding.

Thus, the fuel cell separator of the present invention comprises a substrate made of austenitic stainless steel, and a nitride layer formed on a surface of the substrate in contact with an oxygen electrode or a current collector on the oxygen electrode side, the nitride layer comprising a solid solution compound phase composed of an $Fe_4N$ crystal, in which part of Fe is substituted by at least Cr and Ni.

The solid solution compound phase is formed by nitriding the austenitic stainless steel under predetermined conditions, and represented by $(Fe, Cr, Ni, \ldots)_4N$, wherein $(Fe, Cr, Ni, \ldots)$ represents Fe, and Cr, Ni and other elements dissolved in the austenitic stainless steel. The compound phase is generally called "S phase" [for instance, Heat Treatment, Vol. 25, No. 4 (8), 191-195 (1985), and Surface Technology, Vol. 54, No. 3, 193-199 (2003)]. The solid solution compound usually has peaks at $2\theta$ of $40\pm1°$ and $46\pm1°$ in its X-ray diffraction pattern by a Cu-Kα line. When the nitride layer comprising a compound phase having the above X-ray diffraction pattern is formed, a fuel cell separator having excellent corrosion resistance, electric conductivity and durability can be obtained.

Accordingly, the fuel cell separator of the present invention comprises a substrate made of austenitic stainless steel, and a nitride layer formed on a surface of the substrate in contact with an oxygen electrode or a current collector on the oxygen electrode side, the nitride layer comprising a compound phase having peaks at $2\theta$ of $40\pm1°$ and $46\pm1°$ in its X-ray diffraction pattern by a Cu-Kα line.

The compound phase (S phase) preferably has a thickness of 0.5-150 μm. The area ratio of the compound phase (S phase) occupying a surface of the nitride layer is preferably 25% or more based on the surface area (100%) of the nitride layer. With this area ratio of 25% or more, the separator is provided with further improved electric conductivity and corrosion resistance.

A surface of the fuel cell separator of the present invention on the hydrogen (fuel) electrode side may or may not be provided with a nitride layer comprising an S phase. In any case, a surface of the separator in contact with a hydrogen electrode or a current collector on the hydrogen electrode side preferably has a surface roughness Rz (10-point-average roughness) of 1-100 μm.

REFERENCE NUMERALS

| | |
|---|---|
| 1 | Substrate (austenitic stainless steel), |
| 10 | Separator, |
| 2 | S Phase, |
| 20 | ε Phase, |
| 3 | Carbon fiber plate, |
| 4 | Graphite plate, and |
| 5 | Electrode plate. |

DESCRIPTION OF THE PREFERRED EMBODIMENTS

[1] Substrate

The separator for a fuel cell according to the present invention comprises a substrate made of austenitic stainless steel, which is not particularly restricted but may be SUS304, SUS304L, SUS316, SUS316L, SUS310, SUS310S, SUS321, SUS347, etc. according to JIS. Among them, SUS304, SUS304L, SUS310, SUS310S, SUS316 and SUS316L are preferable, and SUS316 and SUS316L are more preferable. The austenitic stainless steel preferably contains 15-20% by mass of Cr and 5-20% by mass of Ni.

[2] Nitride Layer

The fuel cell separator of the present invention has a corrosion-resistant nitride layer on a surface in contact with an oxygen (air) electrode or a current collector on the oxygen electrode side, which is called "oxygen-electrode-contacting surface" below in any case, unless otherwise mentioned. The nitride layer in the fuel cell separator of the present invention comprises a compound phase, which is an $Fe_4N$ solid solution crystal, wherein part of Fe is substituted by at least Cr and Ni. This compound phase usually has peaks at $2\theta$ of $40\pm1°$ and $46\pm1°$ in an X-ray diffraction pattern by a Cu-Kα line, though not identified by an ASTM card. Both peaks above are displaced to lower- or higher-angle positions depending on the amount of nitrogen contained.

The above compound phase formed by nitriding austenitic stainless steel under predetermined conditions is represented by the formula of (Fe, Cr, Ni, . . . )$_4$N, wherein (Fe, Cr, Ni, . . . ) represents Fe, and Cr, Ni and other elements dissolved in the austenitic stainless steel. This compound phase, which has a face-centered cubic lattice structure, is generally called "S phase." This compound phase is thus called "S phase" below unless otherwise mentioned. For instance, Heat Treatment, Vol. 25, No. 4 (8), 191-195 (1985) describes that the ion-nitriding of austenitic stainless steel with a gas containing N$_2$ and H$_2$ at a volume ratio of 1:9 at 400° C. for 4 hours forms an S phase. Also, Surface Technology, Vol. 54, No. 3, 193-199 (2003) describes that when the NH$_3$- or plasma-nitriding of austenitic stainless steel at a temperature of about 723 K (450° C.) or lower forms an S phase.

The thickness of the S phase is preferably 0.5-150 μm, more preferably 0.5-50 μm, particularly 0.5-30 μm. When the S phase is less than 0.5 μm, sufficient electric conductivity is not likely to be obtained. The S phase of more than 150 μm is likely to lead to reduced corrosion resistance.

The S Phase is formed by nitriding austenitic stainless steel as described above, but under the conditions of forming the S Phase, it is usual that an ε phase having a dense hexagonal structure, which is represented by Fe$_{2-3}$N, is also formed. The ε phase is usually formed on the S phase.

An area ratio of the S phase occupying a surface of the nitride layer, which is called "S phase area ratio" below unless otherwise mentioned, is preferably 25% or more based on the surface area (100%) of the nitride layer. When the S phase area ratio is 25% or more, the area ratio of the ε phase formed on the S phase is less than 75%, providing the separator with improved electric conductivity and corrosion resistance. The S phase area ratio is more preferably 50% or more, further preferably 90% or more, particularly 95% or more. The S phase area ratio was determined by the image analysis of a scanning electron photomicrograph of a separator surface.

The formation of the nitride layer containing the S phase, which may be called simply "the layer of the present invention," on the oxygen-electrode-contacting surface of the austenitic stainless steel separator makes it unlikely for a passive layer to be formed even in an oxidizing atmosphere. Because the S phase has as high electric conductivity as that of graphite, the formation of the layer of the present invention provides excellent conductivity. Because the layer of the present invention has excellent corrosion resistance, it exhibits sufficient corrosion resistance even on the electrode-contacting surface most vulnerable to corrosion.

The layer of the present invention may be formed on the entire oxygen-electrode-contacting surface of the separator, or only on a portion in direct contact with the oxygen electrode. In the latter case, a passive layer is formed on the separator substrate exposed to gas-flowing grooves that are not in direct contact with the oxygen electrode, resulting in excellent corrosion resistance. Of course, excellent conductivity and corrosion resistance are obtained by forming the layer of the present invention on the entire oxygen-electrode-contacting surface of the separator. The gas-flowing grooves may be coated with a chemically or physically stable, corrosion-resistant layer made of polymers, etc.

Because a surface of the separator on the hydrogen electrode side is exposed to a reducing atmosphere, a passive layer is not formed thereon, and the substrate metal is resistant to corrosion. Accordingly, the hydrogen-electrode-side surface of the separator has sufficient conductivity and corrosion resistance without forming the layer of the present invention. When the layer of the present invention is formed on the entire surface of the separator on both oxygen electrode side and hydrogen electrode side, the number of production steps can advantageously be reduced because a nitriding-preventing treatment is not needed.

The corrosion resistance of the S phase formed by nitriding depends on nitriding conditions and the composition of the austenitic stainless steel. When a passive layer on the stainless steel surface has higher corrosion resistance than that of the S phase, the surfaces of the gas-flowing grooves needing no conductivity are preferably not nitrided. The most vulnerable to corrosion is a surface of the separator in contact with the electrode, etc., and the surfaces of the gas-flowing grooves do not need as high corrosion resistance as the contact surface should have. Accordingly, even when the passive layer has higher corrosion resistance than that of the S phase, the entire surface of the separator may be nitrided.

To improve the corrosion resistance and electric conductivity of the separator, the layer of the present invention may be coated with a corrosion-resistant layer made of a precious metal or a conductive resin.

[3] Production Method

The fuel cell separator of the present invention is produced by nitriding the austenitic stainless steel substrate so that the S phase is precipitated. A surface of the substrate provided with a nitride layer is preferably etched to remove an ε phase. The substrate may be worked to a predetermined separator shape having gas flow paths, etc. in advance, and then nitrided. Alternatively, the substrate may be nitrided and then worked to a predetermined separator shape. When the layer of the present invention is formed on only the oxygen electrode side, or only a surface in contact with an electrode or a current collector, a nitride-layer-free surface is subjected to a nitriding-preventing treatment. The nitriding-preventing treatment is conducted by, for instance, a method of forming a nitriding-preventing layer such as a Ni or Cu plating, a water glass coating, etc., and removing the nitriding-preventing layer by electrolytic etching in an acid solution after nitriding. The ε layer in the nitride layer is dissolved away in the course of the electrolytic etching.

(1) Reduction of Passive Layer

A passive layer of the substrate is reduced (activated) before nitriding. The reducing method per se is not particularly restricted, but known methods such as a method of treating with an ammonia gas, a halide-adding method, etc. may be used. However, reducing agents containing carbon sources such as CN$^-$ ion, etc. are preferably avoided, because they hinder the formation of the S phase.

(2) Nitriding

The nitriding method is not particularly restricted. As long as conditions are proper, known methods such as a gas nitriding method, an ion nitriding method, a salt bath nitriding method, a plasma nitriding method, etc. may be used to form the S phase. Among them, the gas nitriding method is preferable.

When the gas nitriding method is used, the activated substrate is nitrided in an atmosphere of a pure nitrogen gas or a mixed gas of NH$_3$ and N$_2$. The resultant S phase is turned to a CrN phase while releasing N$_2$ by a decomposition reaction as the time lapses during nitriding. When the CrN phase is precipitated, the corrosion resistance of the separator is reduced. Accordingly, nitriding is conducted preferably under such conditions that the S phase is retained sufficiently.

It has been considered so far that because the S phase becomes unstable as the temperature is elevated to as high as about 723K (450° C.), austenitic stainless steel nitrided at 450° C. or higher has low corrosion resistance [for instance, Surface Technology, Vol. 54, No. 3, 197 (2003)]. It was recently found, however, that the S phase could be sufficiently formed at relatively high temperatures, as long as the gas-nitriding time is controlled.

Specifically, the gas-nitriding time in a range of 3-300 minutes enables the sufficient formation of the S phase even at relatively high temperatures of 460-600° C. When the nitriding time is shorter than 3 minutes, the S phase formed is not sufficiently thick. When the nitriding time is longer than 300 minutes, the S phase formed is more decomposed. The nitriding time is preferably 3-250 minutes. When the nitriding temperature is lower than 460° C., the nitride layer is formed slowly. When the nitriding temperature is higher than 600° C., the S phase formed is quickly decomposed, resulting in an insufficient amount of the S phase remaining. The nitriding temperature is preferably 470-550° C., more preferably 480-540° C.

The treating gas is preferably a pure nitrogen gas or a mixed gas of $NH_3$ and $N_2$. The treating gas pressure is preferably 0.5-1.0 Pa. To obtain the desired nitride layer stably, nitriding furnace preferably has a Muffle structure. The gas-nitriding as described above forms the nitride layer with a sufficient S phase.

(3) Etching

The $\epsilon$ phase is preferably removed from the nitride layer thus formed. The $\epsilon$ phase can be removed by etching the nitride layer. The etching method is not particularly restricted, but may be an electrolytic etching method for dissolving the $\epsilon$ phase at an anode by electric energy, a chemical etching method using chemicals, a mechanical etching method using abrasives, etc. Among them, the electrolytic etching method or the chemical etching method is preferable.

Figure 1:
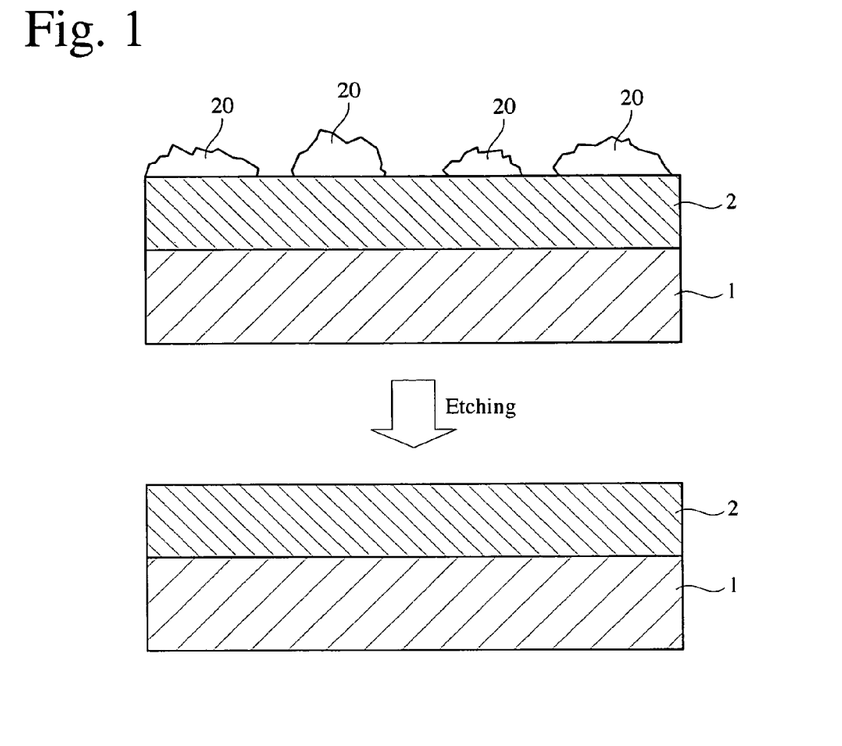
FIG. 1 is a schematic cross-sectional view showing the removal of an ε phase by etching from a separator having a nitride layer.

The removal of the $\epsilon$ phase by etching will be explained referring to the drawings. FIG. 1 is a schematic cross-sectional view showing a separator having a nitride layer. As shown in FIG. 1, a layer of the S phase 2 is formed on the austenitic stainless steel substrate 1, with the $\epsilon$ phase 20 scattered on the S phase 2. With etching conditions properly set, only the $\epsilon$ phase 20 can be removed.

When the electrolytic etching method is used, the composition of an electrolyte, the quantity of electricity, current density, electrolysis time, solution temperature, frequency, current waveform, etc. are properly set depending on the amount of the $\epsilon$ phase to be removed, etc. The etching is usually conducted by constant-voltage electrolysis in an electrolyte. The etching can also be conducted by sweeping voltage from a self-potential to a predetermined noble potential in an electrolyte.

When the chemical etching method is used, the nitride layer is treated with an acid or alkali solution. The acid solution is at least one selected from the group consisting of hydrochloric acid, sulfuric acid, nitric acid and hydrofluoric acid. The alkali solution is an aqueous solution containing at least one selected from the group consisting of hydroxides, halides, carbonates, nitrates, sulfates, phosphates and silicates of alkali or alkaline earth metals. The pH of the acid or alkali solution, treatment time and temperature with these solutions, etc. may be properly set depending on the amount of the $\epsilon$ phase to be removed, etc.

(4) Surface-Roughening

As described above, the fuel cell separator comprising an austenitic stainless steel substrate may or may not have the layer of the present invention on the hydrogen (fuel) electrode side. In any case, a surface of the separator in contact with an hydrogen electrode or a current collector on the hydrogen electrode side (hereinafter referred to as "hydrogen-electrode-contacting surface" unless otherwise mentioned) has surface roughness $R_Z$ (10-point average roughness) adjusted to preferably 1-100 μm, more preferably 5-50 μm. The roughening is conducted by, for instance, an electrolytic etching, an acid etching, or a mechanical method such as grinding, etc.

When roughness is given to the hydrogen-electrode-contacting surface of the separator, on which the layer of the present invention is formed, potential is higher on protrusions in contact with an electrode or a current collector than recesses, so that the nitride layer in contacted areas is stabilized even in a reducing atmosphere, thereby keeping excellent conductivity. Further, because protrusions on the nitride layer surface penetrate into the carbon electrode or the current collector, contact with hydrogen is hindered. Accordingly, the nitride layer has improved stability in a reducing atmosphere, exhibiting excellent conductivity for a long period of time and thus providing the fuel cell with improved durability.

When the separator is used with no nitride layer on a surface on the hydrogen electrode side to conduct continuous operation like a stationary fuel cell, the hydrogen-electrode-contacting surface is always exposed to a reducing atmosphere, so that a passive layer is unlikely to be formed. In this case, the metal matrix exposed to the surface is kept stable, resulting in excellent conductivity. However, when the separator with no nitride layer on a surface on the hydrogen electrode side is used to repeat frequent start and stop like a vehicle-mounted fuel cell, a passive layer is likely to be formed on the contact surface during stop, failing to achieve sufficient conductivity at the time of start. In such a case, the roughening of the contact surface makes it easy for portions in contact with the electrode, etc. to plastically deform, so that the passive layer easily peels off. Further, contact with the electrode or the current collector takes place at points, resulting in improved conductivity. Accordingly, excellent conductivity is achieved as soon as the operation is started after a certain period of stop. The metal is more resistant to corrosion than the nitride in a reducing atmosphere, exhibiting excellent corrosion resistance.

[4] Fuel Cell

The fuel cell may have a known structure. The fuel cell is constituted by laminating pluralities of unit fuel cells (membrane-electrode assemblies) via the separators of the present invention. The unit fuel cell is constituted by a polymer electrolyte membrane, and an anode and a cathode attached to both sides thereof. Each electrode comprises a gas-diffusing layer made of a porous carbonaceous material, etc., and a catalyst layer comprising platinum particles, etc. The catalyst layer is formed by coating catalyst particles on the gas-diffusing layer.

The present invention will be explained in further detail referring to Examples below, without intention of restricting the present invention thereto.

Examples 1-4

(1) Nitriding

A commercially available stainless steel plate (SUS316) having a thickness of 0.5 mm was activated by an $NH_3$ gas at each temperature shown in Table 1 in a Muffle furnace. It was then nitrided by a pure nitrogen gas at each temperature shown in Table 1 for 60 minutes to provide a sample having a nitride layer formed on the entire surface of the plate on both sides.

(2) Analysis of Nitride Layer

Figure 2:
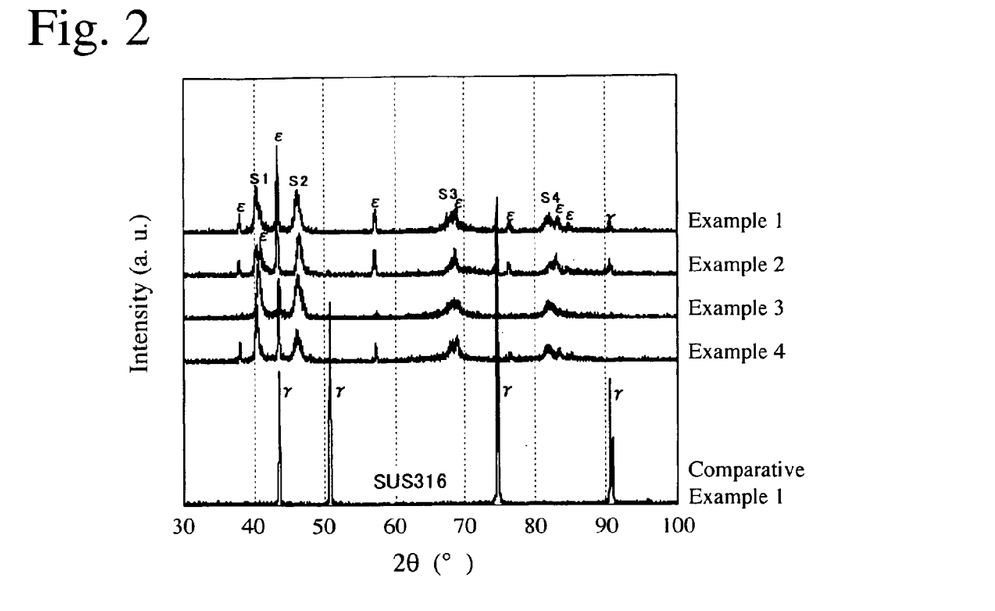
FIG. 2 is the X-ray diffraction patterns of the samples of Examples 1-4 and Comparative Example 1 before electrolytic etching.

The nitride layer was analyzed by an X-ray diffraction (XRD) method using a Cu-Kα line at tube voltage of 40 kV and tube current of 30 mA. The results are shown in FIG. 2. It should be noted that the analysis of the nitride layer was conducted by this method in all cases.

(3) Measurement of Thickness of S Phase

A cross section of each sample was treated with a Marble solution comprising hydrochloric acid and a saturated aqueous solution of copper sulfate (ii) at a volume ratio of 2:1 for several seconds to several minutes. A sample substrate vulnerable to corrosion was turned to black gray after etched with the Marble solution, while an S phase resistant to corrosion remained white gray. The thickness of the S phase was measured on an optical photomicrograph of a cross section of the treated sample. The results are shown in Table 1. It should be noted that the measurement of the thickness of the S phase was conducted by this method in all cases, though the treatment with the Marble solution was 10 seconds in the case of SUS304.

(4) Measurement of S Phase Area Ratio

A scanning electron photomicrograph of a surface of the nitride layer of each sample was supplied to a real-time image analyzer (Luzex F available from Nireco Corporation) to carry out image analysis using Luzex F Standard System Ver. 3.30. In the photomicrograph, the total area $S_\epsilon$ of an ε phase was subtracted from the surface area (100 μm×80 μm) of the nitride layer to determine an area $S_S$ of the S phase. Assuming that the surface area of the nitride layer was 100%, a ratio of the S phase area $S_S$ was determined. The results are shown in Table 1. It should be noted that the measurement of S phase area ratio was conducted by this method in all cases.

(5) Electric Conductivity Measurement

Figure 3:
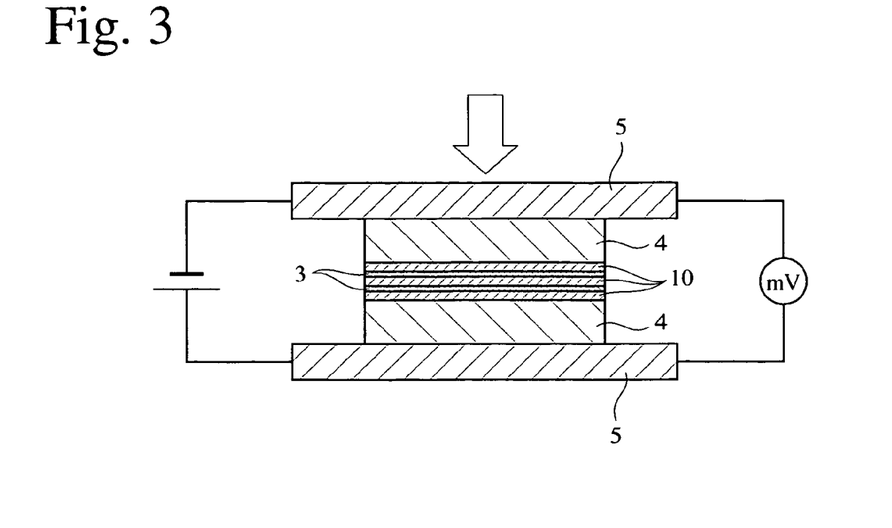
FIG. 3 is a schematic view showing an apparatus for measuring contact resistance.

To determine electric conductivity, contact resistance was measured as follows. As shown in FIG. 3, three separator samples 10 was laminated with carbon fiber plates 3 alternately, and the resultant laminate was sandwiched by graphite plates 4 to produce a laminate (i), which was placed between a pair of gold-plated, planar stainless steel electrodes 5, 5. While applying a surface pressure of 8 kg/cm$^2$, current was supplied to the laminate (i) at a relative humidity of 50%, a temperature of 20° C. and a current density of 1.0 A/cm$^2$, to measure voltage decrease at the electrodes, thereby determining the contact resistance of the laminate (i). With respect to a laminate (ii) produced by sandwiching two carbon fiber plates 3 by graphite plates 4, voltage decrease at the electrodes was measured in the same manner as above, to determine its contact resistance. The difference in contact resistance between the laminate (i) and the laminate (ii) was defined as the contact resistance between the three separator samples 10. The results are shown in Table 1. It should be noted that all electric conductivity measurements below were conducted by this method.

(6) Corrosion Resistance Measurement

Figure 4:
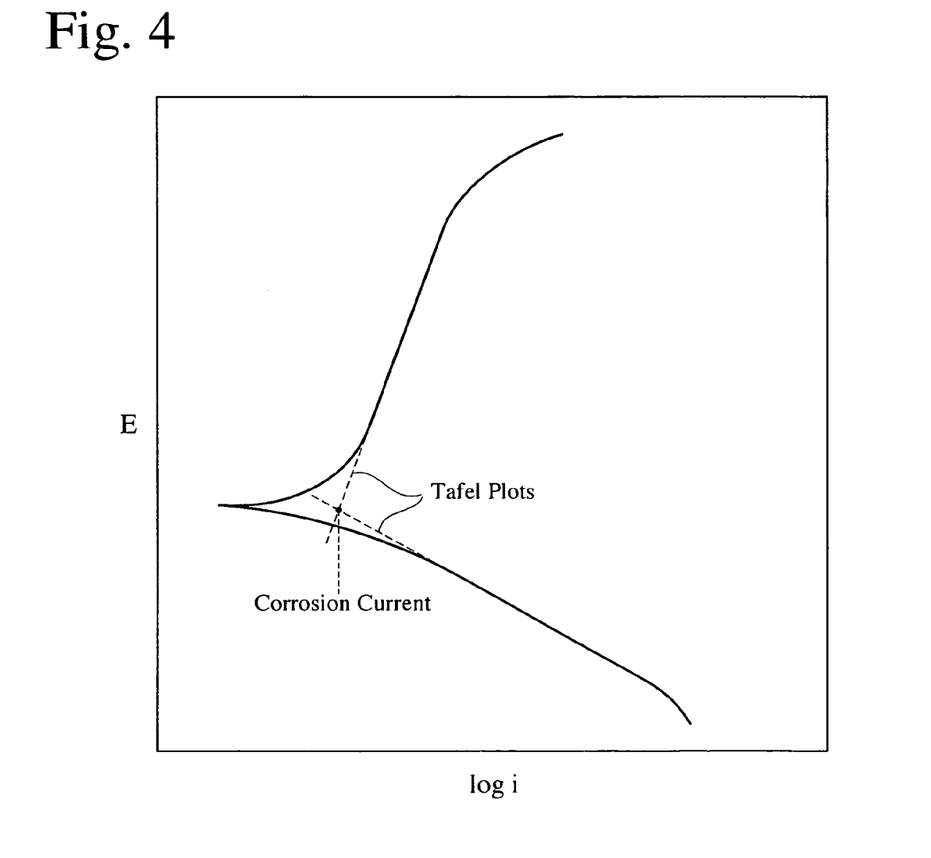
FIG. 4 is a graph showing one example of Tafel plots.

To determine corrosion resistance, corrosion current was measured as follows. With each sample as a working electrode, a platinum electrode as a counter electrode, and a silver/silver chloride electrode as a reference electrode in a 3% acetic acid solution, voltage was increased from −0.5 V to 1.0 V with an increment of 0.02 V, and kept at each voltage for 3 minutes to measure current. The data of current i and voltage E were used to plot log i (absolute value of current) relative to voltage E (Tafel plot). FIG. 4 shows an example of Tafel plots. In the E-log i curves as shown in FIG. 4, their straight line portions on the reduction side and the oxidation side are extended as Tafel straight lines to determine a point of their intersection. Current $i_{corr}$ at the intersection was defined as corrosion current. The results are shown in Table 1. It should be noted that all corrosion resistance measurements below were conducted by this method.

(7) Electrolytic Etching

With each nitrided sample as a working electrode and a platinum electrode as a counter electrode in a 3-% acetic acid solution, electrolytic etching was conducted by sweeping voltage 10 times between 0 V and 1.2 V relative to a hydrogen reference electrode (RHE) at a sweeping speed of 1 mV/s.

(8) Analysis of Nitride Layer of Etched Sample

Figure 5:
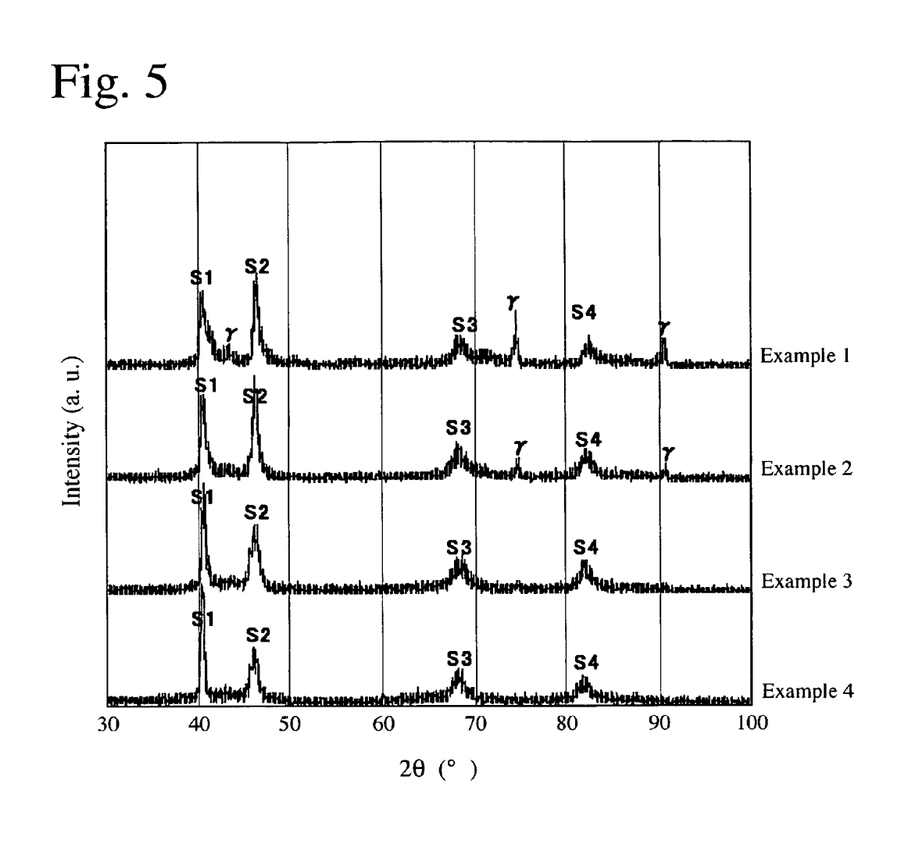
FIG. 5 is the X-ray diffraction patterns of the samples of Examples 1-4 after electrolytic etching.

The nitride layer of the etched sample was analyzed by the same XRD method as (2) above. The results are shown in FIG. 5.

(9) Corrosion Resistance Measurement of Etched Sample

The corrosion resistance of each etched sample was measured by the same method as (6) above. The results are shown in Table 1.

Reference Example 1

The electric conductivity and corrosion resistance of a planar, molded graphite body having a thickness of 0.5 mm were measured. The results are shown in Table 1.

Comparative Example 1

The same stainless steel plate (SUS316) having a thickness of 0.5 mm as in Example 1 was measured with respect to electric conductivity and corrosion resistance in an unnitrided state. The results are shown in Table 1.

Comparative Example 2

The same stainless steel plate (SUS316) having a thickness of 0.5 mm as in Example 1 was nitrided in a salt bath at 570° C. for 30 minutes. The observation of the X-ray diffraction pattern of a surface of the nitrided sample revealed that though peaks identified as a CrN phase, a γ phase, a γ′ phase and an $Fe_3O_4$ phase were detected, no peaks corresponding to the S phase were detected. The electric conductivity and corrosion resistance of the sample were measured. The results are shown in Table 1.

TABLE 1

| No. | Stainless Steel | Activation Temperature (° C.) | Nitriding Temperature (° C.) | Time (minutes) | Thickness of S Phase (μm) |
|---|---|---|---|---|---|
| Example 1 | SUS316 | 440 | 440 | 60 | 3 |
| Example 2 | SUS316 | 470 | 470 | 60 | 4 |
| Example 3 | SUS316 | 500 | 500 | 60 | 5.5 |
| Example 4 | SUS316 | 530 | 530 | 60 | 12 |
| Reference Example 1 | —[(1)] | — | — | — | — |
| Comparative Example 1 | SUS316 | — | — | — | — |
| Comparative Example 2 | SUS316 | — | 570[(2)] | 30[(2)] | — |

| No. | Before Electrolytic Etching | | | After Electrolytic Etching |
|---|---|---|---|---|
| | S phase Area Ratio (%) | Contact Resistance (mΩ/cm$^2$) | Corrosion Current (μA/cm$^2$) | Corrosion Current (μA/cm$^2$) |
| Example 1 | 25 | 11.6 | 4.9 | 3.0 |
| Example 2 | 66 | 9.8 | 3.8 | 2.8 |
| Example 3 | 92 | 7.6 | 3.0 | 1.8 |
| Example 4 | 95 | 5.5 | 2.8 | 2.5 |
| Reference Example 1 | — | 5.2 | 0.3 | — |
| Comparative Example 1 | — | 70.4 | 1.5 | — |
| Comparative Example 2 | — | 3.4 | 8.2 | — |

Note:
[(1)]Graphite.
[(2)]Nitriding in a salt bath.

Figure 6:
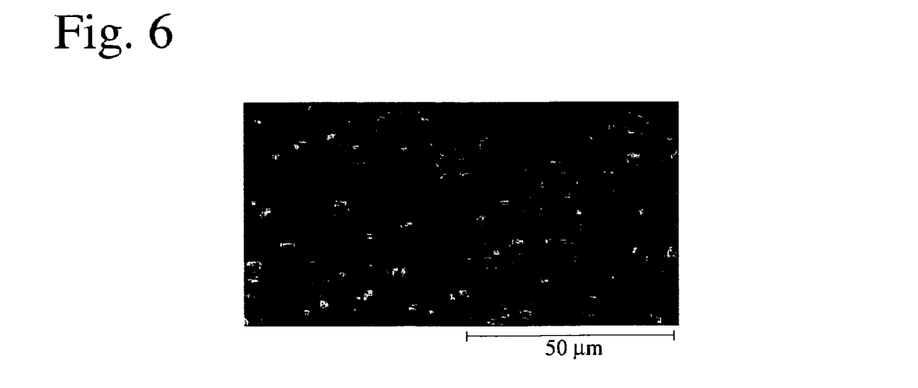
FIG. 6 is a photomicrograph (800 times×800 times) showing a surface of the sample of Example 3 before electrolytic etching.
Figure 7:
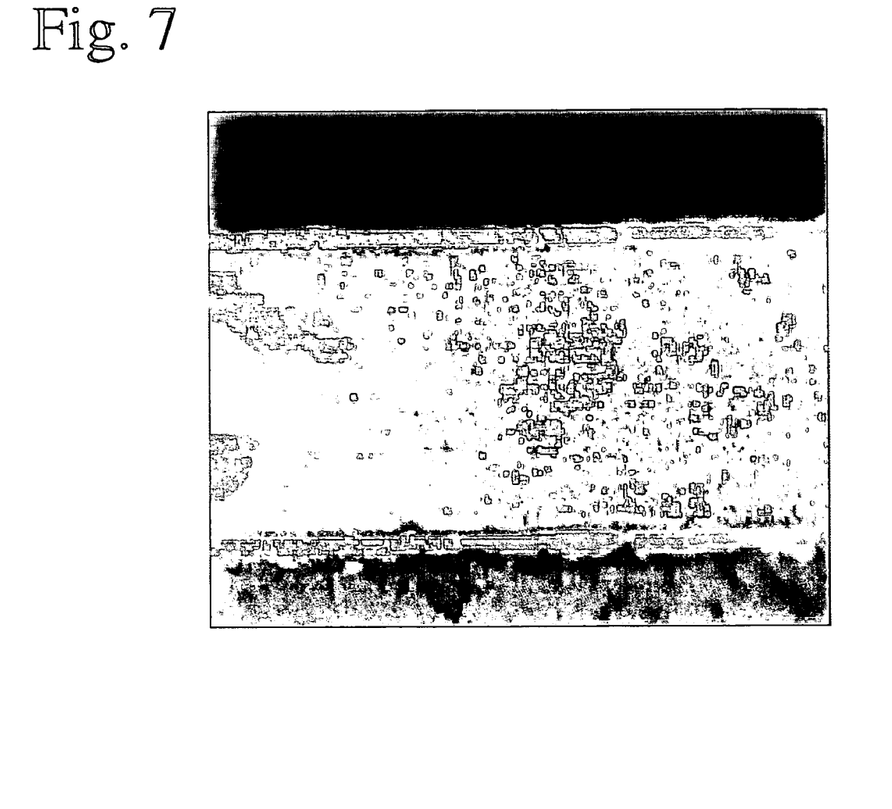
FIG. 7 is a photomicrograph (90 times×90 times) showing the cross section of the sample of Example 3 before electrolytic etching.

It is clear from FIG. 2 that the X-ray diffraction patterns of Examples 1-4 had peaks corresponding to the S phase at diffraction angles (2θ) of substantially 40° (S1) and 46° (S2). In addition, peaks corresponding to the S phase were also observed at 68° (S3) and 82° (S4). FIG. 6 is a scanning electron photomicrograph of a surface of the sample of Example 3 before electrolytic etching. It was observed that the S phase was formed on an entire surface of the sample, with an ε phase of several μm to ten-odd μm in diameter dispersed thereon. FIG. 7 is an optical photomicrograph showing a cross section of the sample of Example 3 after Marble etching and before electrolytic etching. It was observed that the S phase [white gray layers formed on both surfaces of a black gray substrate (upper and lower surfaces of the substrate in the photograph)] was formed on an entire surface of the sample.

Figure 8:
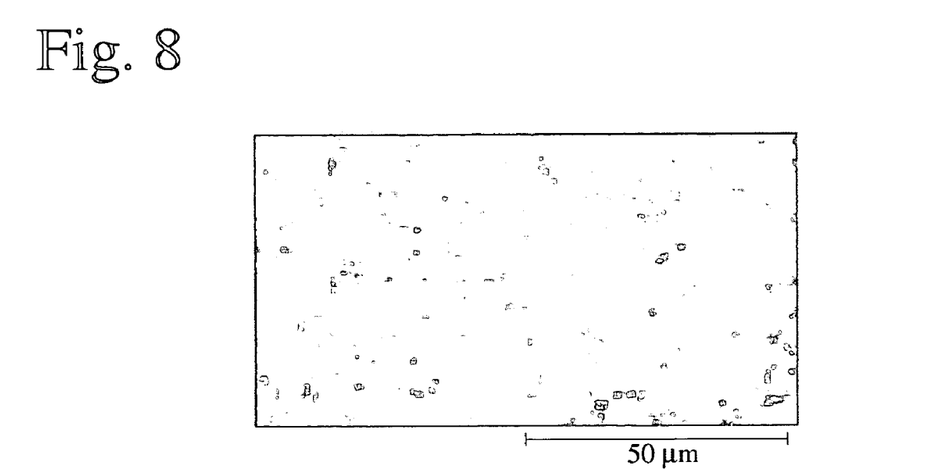
FIG. 8 is a photomicrograph (800 times×800 times) showing a surface of the sample of Example 3 after electrolytic etching.

It is clear from FIG. 5 that an ε phase was not detected in the X-ray diffraction measurement after electrolytic etching. FIG. 8 is a scanning electron photomicrograph showing a surface of the sample of Example 3 after electrolytic etching. It was confirmed that the ε phase was removed from an entire surface of the sample, resulting in the S phase area ratio of substantially 100%. Scanning electron photomicrographs revealed that the S phase area ratio was substantially 100% in any samples of Examples 1, 2 and 4 after electrolytic etching.

It is clear from Table 1 that any sample of Examples 1-4 and Comparative Example 2 provided with a nitride layer had lower contact resistance than that of the unnitrided sample of Comparative Example 1. Particularly the sample of Example 4, whose S phase was as thick as 10 μm or more and had an area ratio of 95% or more, had the same electric conductivity as that of graphite (Reference Example 1). Any sample of Examples 1-4, in which the S phase was detected, had smaller corrosion current than that of Comparative Example 2, in which the S phase was not detected, confirming that the formation of the S phase improved corrosion resistance. Though the desired corrosion current may vary depending on the use of the separator, etc., the corrosion current of 5 μA/cm$^2$ or less would provide practically satisfactory corrosion resistance to the separator for use in a fuel cell. It was also found that any sample had contact resistance of about 5 mΩ/cm$^2$ after electrolytic etching, exhibiting excellent electric conductivity. It was further found that samples with an S phase area ratio of 100% after electrolytic etching had lower corrosion current than before electrolytic etching, thereby having improved corrosion resistance.

Examples 5-8

Samples provided with nitride layers were produced in the same manner as in Examples 1-4, except that commercially available stainless steel plates (SUS304) having a thickness of 0.5 mm were used, and that the nitriding time was 30 minutes. The investigation of the X-ray diffraction pattern of a nitride layer of each sample revealed that there were peaks at diffraction angles (2θ) of substantially 40° (S1) and 46° (S2). Each sample was measured with respect to the thickness and area ratio of the S phase, electric conductivity and corrosion resistance. The results are shown in Table 2. Further, with each nitrided sample as a working electrode and a platinum electrode as a counter electrode in a 3-% acetic acid solution, electrolytic etching was conducted to each nitrided sample at a constant voltage of 1.5 V. The corrosion current of each etched sample was measured. The results are shown in Table 2.

Comparative Example 3

The same stainless steel plate (SUS304) having a thickness of 0.5 mm as in Example 5 was measured in an unnitrided state with respect to electric conductivity and corrosion resistance. The results are shown in Table 2.

that the electrolytically etched sample having an S phase area ratio of 100% had lower corrosion current than before electrolytic etching, exhibiting improved corrosion resistance.

Examples 9-16

A commercially available stainless steel plate (SUS316) having a thickness of 0.5 mm was activated with an $NH_3$ gas at a temperature of 500° C. in a Muffle furnace. Nitriding with a pure nitrogen gas was then conducted with various nitriding

TABLE 2

| No. | Stainless Steel | Activation Temperature (° C.) | Nitriding Temperature (° C.) | Time (minutes) | Thickness of S Phase (μm) |
|---|---|---|---|---|---|
| Example 5 | SUS304 | 440 | 440 | 30 | 3.5 |
| Example 6 | SUS304 | 470 | 470 | 30 | 5 |
| Example 7 | SUS304 | 500 | 500 | 30 | 7 |
| Example 8 | SUS304 | 530 | 530 | 30 | 14.5 |
| Comparative Example 3 | SUS304 | — | — | — | — |

| No. | Before Electrolytic Etching | | | After Electrolytic Etching Corrosion Current (μA/cm²) |
|---|---|---|---|---|
| | S phase Area Ratio (%) | Contact Resistance (mΩ/cm²) | Corrosion Current (μA/cm²) | |
| Example 5 | 21 | 12.3 | 5.3 | 2.8 |
| Example 6 | 63 | 10.2 | 4.2 | 2.2 |
| Example 7 | 91 | 7.2 | 3.1 | 1.7 |
| Example 8 | 96 | 5.3 | 2.9 | 1.5 |
| Comparative Example 3 | — | 150 | 5.0 | — |

Table 2 shows that any sample of Examples 5-8, in which an S phase was detected, had lower contact resistance than that of Comparative Example 3 with no nitride layer, confirming that the formation of a nitride layer improved electric conductivity. It was found that any sample of Examples 5-8 had low corrosion current, particularly those of Examples 7 and 8 having S phase area ratios of 90% or more had sufficiently low corrosion current without electrolytic etching, exhibiting excellent corrosion resistance.

The observation of a surface of each sample after electrolytic etching by a scanning electron microscope revealed that any sample was deprived of an ε phase, resulting in an S phase area ratio of substantially 100%. Also, any sample after electrolytic etching had contact resistance of about 5 mΩ/cm², exhibiting excellent electric conductivity. It was further found temperatures and time periods to produce samples with S phases having different thicknesses as shown in Table 3. With each sample as a working electrode and a platinum electrode as a counter electrode in a 3-% acetic acid solution, electrolytic etching was conducted by sweeping voltage between 0 V and 1.2 V relative to a hydrogen reference electrode (RHE) 10 times at a sweeping speed of 1 mV/s. X-ray diffraction pattern observation revealed that the nitride layer of each sample had peaks at diffraction angles (2θ) of substantially 40° (S1) and 46° (S2). Further, the electric conductivity and corrosion resistance of each sample were measured. The results are shown in Table 3.

TABLE 3

| No. | Stainless Steel | Activation Temperature (° C.) | Electrolytic Etching | Thickness of S phase (μm) | Contact Resistance (mΩ/cm²) | Corrosion Current (μA/cm²) |
|---|---|---|---|---|---|---|
| Example 9 | SUS316 | 500 | Yes | 0.3 | >15 | 1-2 |
| Example 10 | SUS316 | 500 | Yes | 1.0 | ≦15 | 1-2 |
| Example 11 | SUS316 | 500 | Yes | 5.0 | ≦15 | 1-2 |
| Example 12 | SUS316 | 500 | Yes | 10.0 | ≦15 | 1-2 |
| Example 13 | SUS316 | 500 | Yes | 25 | ≦15 | 1-2 |
| Example 14 | SUS316 | 500 | Yes | 51 | ≦15 | 2-3 |
| Example 15 | SUS316 | 500 | Yes | 103 | ≦15 | 2-3 |
| Example 16 | SUS316 | 500 | Yes | 130 | ≦15 | 3-5 |

It is clear from Table 3 that the thickness of the S phase of 1 μm or more provides good electric conductivity, that the thickness of the S phase of 0.3-103 μm provides better corrosion resistance, and that the thickness of the S phase of 0.3-25 μm provides best corrosion resistance.

Examples 17-24

Various commercially available austenitic stainless steel plates (thickness: 0.5 mm) shown in Table 4 were activated and nitrided in a Muffle furnace in the same manner as in Example 1. With each nitrided sample as a working electrode and a platinum electrode as a counter electrode in a 3-% acetic acid solution, electrolytic etching was conducted at a constant voltage of 1.5 V. X-ray diffraction pattern observation revealed that the nitride layer of each sample had peaks at diffraction angles (2θ) of substantially 40° (S1) and 46° (S2). The electric conductivity and corrosion resistance of each sample were measured. The results are shown in Table 4.

Comparative Example 4

The same treatment as in Examples 17-24 was conducted to a ferritic stainless steel plate (SUS430) having a thickness of 0.5 mm, and a nitride layer of the resultant sample was analyzed by the same XRD method as above. As a result, no S phase was observed. Further, the electric conductivity and corrosion resistance of the sample were measured. The results are shown in Table 4.

Comparative examples 5 and 6

The same treatment as in Examples 17-24 was conducted to martensitic stainless steel plates (SUS410 and SUS440A) each having a thickness of 0.5 mm, and a nitride layer of each of the resultant samples was analyzed by the same XRD method as above. As a result, no S phase was observed. Further, the electric conductivity and corrosion resistance of the samples were measured. The results are shown in Table 4.

TABLE 4

| No. | Stainless Steel | Electrolytic Etching | Contact Resistance (mΩ/cm$^2$) | Corrosion Current (μA/cm$^2$) |
|---|---|---|---|---|
| Example 17 | SUS304 | Yes | ≦15 | 2-3 |
| Example 18 | SUS304L | Yes | ≦15 | 2-3 |
| Example 19 | SUS316 | Yes | ≦15 | 2-3 |
| Example 20 | SUS316L | Yes | ≦15 | 2-3 |
| Example 21 | SUS310 | Yes | ≦15 | 2-3 |
| Example 22 | SUS310S | Yes | ≦15 | 2-3 |
| Example 23 | SUS321 | Yes | ≦15 | 2-3 |
| Example 24 | SUS347 | Yes | ≦15 | 2-3 |
| Comparative Example 4 | SUS430 | Yes | ≦15 | 10-15 |
| Comparative Example 5 | SUS410 | Yes | ≦15 | 10-15 |
| Comparative Example 6 | SUS440A | Yes | ≦15 | 10-15 |

Table 4 shows that Examples 17-24 had lower corrosion current than that of Comparative Examples 4-6 with no S phase, confirming that the formation of an S phase improves corrosion resistance.

Examples 25-28

Separator samples each having the nitride layer of the present invention on a surface only on the side of an oxygen electrode was produced as follows. A stainless steel plate (SUS316, thickness; 0.5 mm) worked to a separator shape was subjected to Ni plating with an organic mask formed on a surface on the oxygen electrode side, to form a 2-μm-thick Ni layer on a surface on the hydrogen electrode side. With the organic mask removed, each sample was activated under the same conditions as in Examples 1-4, and then nitrided with a pure nitrogen gas at each temperature shown in Table 5 for 30 minutes. Each activated sample was electrolytically etched under the same conditions as in Examples 1-4, to remove an ε phase from the oxygen-electrode-side side of a nitride layer and a Ni layer from the hydrogen-electrode-side surface. The thickness of each nitride layer formed on the oxygen electrode side, and the corrosion current before and after electrolytic etching were substantially the same as those of Examples 1-4. With each sample immersed in a 3-% acetic acid solution, a reaction current density was measured at voltage of 0 V and 1.2 V on the oxygen-electrode-side surface of the nitride layer and the hydrogen-electrode-side surface of the stainless steel substrate. The results are shown in Table 5.

TABLE 5

| No. | Stainless Steel | Nitriding Temperature (° C.) | Nitriding Time (minutes) | Thickness of Nitride Layer (μm) |
|---|---|---|---|---|
| Example 25 | SUS316 | 440 | 30 | 3.2 |
| Example 26 | SUS316 | 470 | 30 | 4.3 |
| Example 27 | SUS316 | 500 | 30 | 5.7 |
| Example 28 | SUS316 | 530 | 30 | 12.5 |

| | Reaction Current Density (μA/cm$^2$) at | | | |
|---|---|---|---|---|
| | Voltage of 0 V | | Voltage of 1.2 V | |
| No. | Stainless Steel Surface | Nitride Layer Surface | Stainless Steel Surface | Nitride Layer Surface |
| Example 25 | 0.0 | −0.2 | 4.6 | 2.8 |
| Example 26 | 0.0 | −0.2 | 4.5 | 2.2 |
| Example 27 | 0.0 | −0.3 | 4.7 | 1.7 |
| Example 28 | 0.0 | −0.4 | 4.8 | 1.5 |

As is clear from Table 5, when the applied voltage was 0 V, no reaction current was generated on a surface of the stainless steel matrix, while a reaction current was generated on a surface of the nitride layer on the oxygen electrode side. When the applied voltage was 1.2 V, a reaction current was generated on both surfaces on the hydrogen electrode side and the oxygen electrode side, with smaller current density on the nitride layer on the oxygen electrode side. This indicates that the nitride layer is more stable and higher in corrosion resistance than the stainless steel substrate at higher voltage, while the stainless steel substrate is more stable and higher in corrosion resistance than the nitride layer at lower voltage. To secure the stability and corrosion resistance of the separator in a wider voltage range, it is preferable that a surface on the hydrogen electrode side is constituted by the stainless steel matrix, while a surface on the oxygen electrode side is constituted by the nitride layer.

Examples 29-38

The nitride layer of the present invention was formed on only one surface of each austenitic stainless steel plate. Specifically, samples were produced under the same conditions as in Example 25 except that commercially available austenitic stainless steel plates (SUS316 and SUS310) having a thickness of 0.5 mm were used, and that the nitriding temperature was set at 500° C. After electrolytic etching under the same conditions as in Examples 1-4 to remove an ε phase and a Ni layer, a surface of the stainless steel substrate to be contacted with a hydrogen electrode was roughened with 5 types of sandpapers having different grit sizes shown in Table 6, washed and dried. The contact resistance of each sample was measured before and after roughening. After the contact resistance was once measured, each sample was put in the same corrosive environment as in the above corrosion resistance measurement, and the contact resistance was measured again. The results are shown in Table 6.

TABLE 6

| No. | Stainless Steel | Nitriding Temperature (° C.) | Nitriding Time (minutes) | Sand Paper (Grit sizes) | Surface Roughness Rz (μm) |
|---|---|---|---|---|---|
| Example 29 | SUS310 | 500 | 30 | 200 | 50 |
| Example 30 | SUS310 | 500 | 30 | 400 | 40 |
| Example 31 | SUS310 | 500 | 30 | 600 | 30 |
| Example 32 | SUS310 | 500 | 30 | 800 | 20 |
| Example 33 | SUS310 | 500 | 30 | 1,000 | 10 |
| Example 34 | SUS316 | 500 | 30 | 200 | 50 |
| Example 35 | SUS316 | 500 | 30 | 400 | 40 |
| Example 36 | SUS316 | 500 | 30 | 600 | 30 |
| Example 37 | SUS316 | 500 | 30 | 800 | 20 |
| Example 38 | SUS316 | 500 | 30 | 1,000 | 10 |

| | Contact Resistance (mΩ/cm$^2$) | | |
|---|---|---|---|
| No. | Before Roughening | First Measurement[1] | Second Measurement(2) |
| Example 29 | 35.5 | 6.5 | 9.7 |
| Example 30 | 36.3 | 5.8 | 9.2 |
| Example 31 | 40.5 | 6.2 | 10.8 |
| Example 32 | 42.1 | 5.4 | 12.4 |
| Example 33 | 38.2 | 6.8 | 13.2 |
| Example 34 | 36.2 | 7.0 | 8.9 |
| Example 35 | 40.1 | 6.8 | 8.2 |
| Example 36 | 39.2 | 6.5 | 10.3 |
| Example 37 | 37.4 | 6.7 | 12.6 |
| Example 38 | 34.2 | 6.4 | 13.0 |

Note:
[1]Measured after roughening, washing and drying.
[2]After the first contact resistance measurement, put in the same corrosive environment as in the corrosion resistance measurement, and measured again.

Table 6 shows that any sample whose electrode-contacting surface was roughened had extremely reduced contact resistance and thus improved conductivity. In any sample, the contact resistance was low after put in the corrosive environment. This indicates that the controlling of the surface roughness $R_Z$ of the electrode-contacting surface (on the hydrogen electrode side) of the separator to 10-50 μm can prevent a conductivity-lowering passive layer from being formed on the electrode-contacting surface while the operation is stopped.

Examples 39 and 40

Each separator of Examples 27 and 35 was assembled with a polymer electrolyte membrane, a cathode, an anode and current collector, and fastened by bolts to produce a cell unit. The separator of Example 27 was used in Example 39, and the separator of Example 35 was used in Example 40. The electrolytic polymer membrane was Nafion® as thick as 170 μm. The cathode and the anode were carbon black carrying a Pt catalyst. The current collector was constituted by a 250-μm-thick carbon paper having a porosity of about 50%. A fuel gas (hydrogen) and an oxidizing gas (air) were supplied to this fuel cell unit to conduct a power generation test at a temperature of 60° C. and voltage of 0.65 V, thereby investigating the change of current density with time. The results are shown in FIG. 9.

Comparative Example 7

A power generation test was conducted in the same manner as in Example 39, on a 0.5-mm-thick, planar stainless steel (SUS316) separator unnitrided on both surfaces. The results are shown in FIG. 9.

Figure 9:
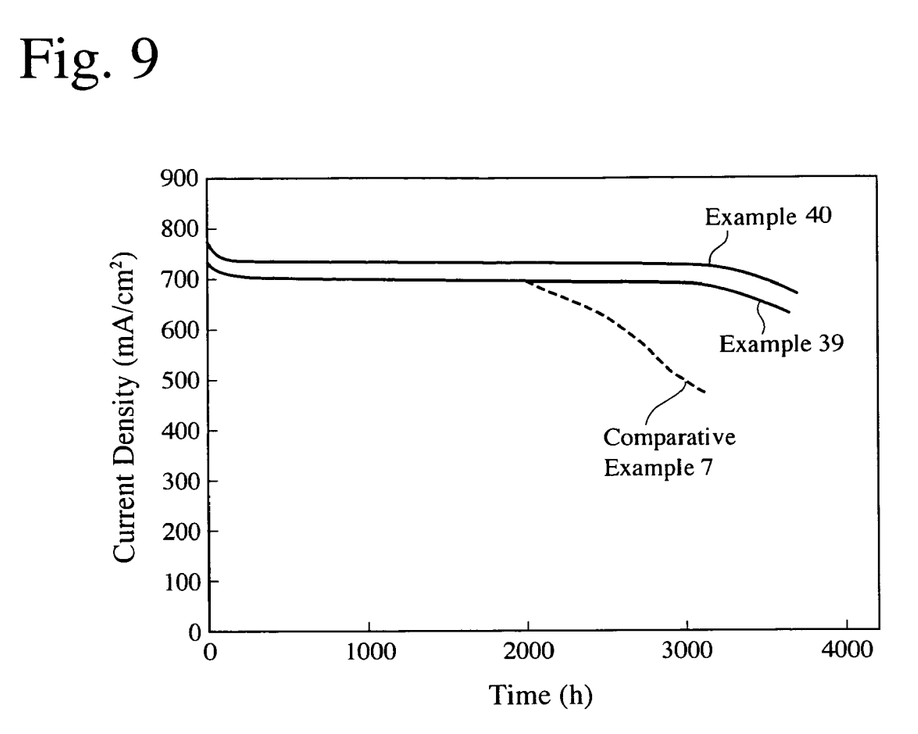
FIG. 9 is a graph showing the relation between a current density and the lapse of time in the power generation test of the fuel cells of Examples 39 and 40 and Comparative Example 7.

As is clear from FIG. 9, while the fuel cell unit of Comparative Example 7 suffered large decrease in current density after 2,000 hours, the fuel cell units of Examples 39 and 40 kept substantially constant current densities until 3,500 hours. This indicates that the formation of the layer of the present invention on a separator on the oxygen electrode side remarkably improves the durability of a fuel cell. Particularly in Example 40, in which an electrode-contacting surface of the separator on the hydrogen electrode side was roughened, had a higher current density than that of Example 39, in which the hydrogen-electrode-contacting surface was not roughened.

EFFECT OF THE INVENTION

The separator for a fuel cell according to the present invention, which comprises an S-phase-containing nitride layer formed on an austenitic stainless steel substrate, has excellent corrosion resistance, electric conductivity and durability. Fuel cells with high current density and excellent durability can be obtained by using the separator of the present invention. The separator of the present invention is particularly suitable for ion-exchange-polymer-membrane-type fuel cells, such as vehicle-mounted fuel cells, small portable fuel cells, stationary home fuel cells, etc.

What is claimed is:

1. A separator for a fuel cell comprising:
   a substrate made of austenitic stainless steel, and
   a nitride layer formed on a surface of said substrate in contact with an oxygen electrode or a current collector on the oxygen electrode side,
   said nitride layer comprising a solid solution compound phase composed of an Fe$_4$N crystal, in which part of Fe is substituted by at least Cr and Ni, and the area ratio of said compound phase occupying a surface of said nitride layer is 25% or more based on the surface area (100%) of said nitride layer.

2. A separator for a fuel cell comprising:
   a substrate made of austenitic stainless steel, and
   a nitride layer formed on a surface of said substrate in contact with an oxygen electrode or a current collector on the oxygen electrode side,
   said nitride layer comprising a compound phase having peaks at 2θ of 40±1° and 46±1° in its X-ray diffraction pattern by an X-ray diffraction method using a Cu-Kα line at a tube voltage of 40 kV and a tube current of 30 mA, and the area ratio of said compound phase occupying a surface of said nitride layer is 25% or more based on the surface area (100%) of said nitride layer.

3. The separator for a fuel cell according to claim 1 or 2, wherein said compound phase has a thickness of 0.5-150 μm.

* * * * *